US008166780B2

(12) United States Patent
Huang

(10) Patent No.: US 8,166,780 B2
(45) Date of Patent: May 1, 2012

(54) BATHING-MASSAGE GLOVE AND METHOD OF MANUFACTURING THE SAME

(76) Inventor: Cheng-Chun Huang, Lugang Township (TW)

( * ) Notice: Subject to any disclaimer, the term of this patent is extended or adjusted under 35 U.S.C. 154(b) by 0 days.

(21) Appl. No.: 12/980,517

(22) Filed: Dec. 29, 2010

(65) Prior Publication Data

US 2011/0167582 A1 Jul. 14, 2011

(30) Foreign Application Priority Data

Jan. 12, 2010 (TW) ................................ 99200571 U

(51) Int. Cl.
*D04B 7/34* (2006.01)
(52) U.S. Cl. ........................................... 66/174; 66/202
(58) Field of Classification Search .................... 66/174, 66/194, 202; 139/383 R, 384 R, 383 B; 2/158, 2/159
See application file for complete search history.

(56) References Cited

U.S. PATENT DOCUMENTS

| 1,941,320 | A | * | 12/1933 | Pamplin ............................. 401/7 |
| 2,101,027 | A | * | 12/1937 | Karger .............................. 15/227 |
| 2,151,448 | A | * | 3/1939 | Steinberg .......................... 2/158 |
| 2,342,547 | A | * | 2/1944 | Kuehnel ............................ 2/158 |
| 3,252,176 | A | * | 5/1966 | Gropper et al. ................ 15/209.1 |
| 3,337,893 | A | * | 8/1967 | Fine et al. ......................... 15/111 |
| 3,711,889 | A | * | 1/1973 | Jennings .......................... 15/227 |
| 4,138,374 | A | * | 2/1979 | Currie .............................. 521/48 |
| 4,670,930 | A | * | 6/1987 | Lu ..................................... 15/118 |
| 4,825,499 | A | * | 5/1989 | Baptiste ........................... 15/227 |
| 4,932,095 | A | * | 6/1990 | Kawase ............................ 15/227 |
| 4,953,250 | A | * | 9/1990 | Brown ......................... 15/104.94 |
| 4,980,943 | A | * | 1/1991 | Barber ............................. 15/227 |
| 5,134,746 | A | * | 8/1992 | William ........................... 15/227 |
| 5,554,657 | A | * | 9/1996 | Brownscombe et al. ........ 521/48 |
| 6,109,070 | A | * | 8/2000 | Chen ................................ 66/174 |
| 6,292,948 | B1 | * | 9/2001 | Chen ................................. 2/158 |
| 6,292,949 | B1 | * | 9/2001 | Chang .............................. 2/159 |
| 6,716,202 | B1 | * | 4/2004 | Hood .............................. 604/290 |
| 7,179,007 | B2 | * | 2/2007 | Wong et al. .................... 401/201 |
| 2005/0112972 | A1 | * | 5/2005 | Tsukamoto et al. ........... 442/189 |
| 2007/0283516 | A1 | * | 12/2007 | Rasmussen et al. ............ 15/160 |
| 2008/0081898 | A1 | * | 4/2008 | Ross et al. .................. 528/308.6 |

\* cited by examiner

*Primary Examiner* — Danny Worrell
(74) *Attorney, Agent, or Firm* — Rabin & Berdo, P.C.

(57) ABSTRACT

A method of manufacturing a bathing-massage glove includes a preparing step, a pre-treating step, a knitting step and a forming step. The preparing step includes preparing a nylon segment with multiple nylon yarns and an environmental-regenerative segment with multiple polyethylene terephthalate bottles. The pre-treating step includes ruffling the nylon yarns of the nylon segment to form multiple winding nylon crepes and processing the polyethylene terephthalate bottles of the environmental-regenerative segment to form multiple environmental-regenerative crepes. The knitting step includes knitting the nylon crepes of the nylon segment and the environmental-regenerative crepes of the environmental-regenerative segment with a knitting speed ratio of 4:5. The forming step includes cutting and seaming a basketwork that is knit by the nylon crepes and the environmental-regenerative crepes to form the bathing-massage glove.

10 Claims, 6 Drawing Sheets

Preparing Step

Pre-treating Step

Knitting Step

Forming Step

US 8,166,780 B2

BATHING-MASSAGE GLOVE AND METHOD OF MANUFACTURING THE SAME

BACKGROUND OF THE INVENTION

1. Field of the Invention

The present invention relates to a manufacturing method, and more particularly relates to a method of manufacturing a bathing-massage glove that can provide a preferred bathing-massage effect.

2. Description of Related Art

In the past, nylon, polyethylene, ramie or cotton were commonly used to manufacture conventional bathing-massage gloves. Among the aforementioned materials, nylon is tough, is mould-proof and is lighter than the other materials. However, the water absorption of nylon is not sufficient. Polyethylene is highly resistant to chemical reagents, but has low heat resistance. Ramie or cotton is soft and has higher water absorption than nylon. However, Ramie or cotton easily gets mildewed. In addition, with the rising awareness of environmental protection globally, recycling the used objects can reduce the wasting of the earth's resource. Therefore, development and popularity in recyclable textile products, organic cotton, decomposable textile products or environmental-regenerative crepe basketwork have arisen significantly.

The conventional environmental-regenerative crepe basketwork is mostly made from the polyethylene terephthalate bottles (P.E. bottles) and this can save the raw materials and energy, shorten the reaction process and reduce the emission of carbon dioxide. The conventional environmental-regenerative crepe basketwork made from the P.E. bottles is non-toxic and innocuous, is elastic and is softer and has higher water absorption than nylon.

However, the conventional environmental-regenerative crepe basketwork is not tough and the wrinkle of the conventional bathing-massage gloves that are made of the conventional environmental-regenerative crepe basketwork may gradually lose the corrugation after being in use for a long period of time and this will influence the bathing and cleaning effect and the tactility of massage.

Therefore, the present invention provides a method of manufacturing a bathing-massage glove and a bathing-massage glove to mitigate or obviate the aforementioned problems.

SUMMARY OF THE INVENTION

The main objective of the present invention is to provide a method of manufacturing a bathing-massage glove that can provide a preferred bathing-massage effect.

The method of manufacturing a bathing-massage glove in accordance with the present invention includes a preparing step, a pre-treating step, a knitting step and a forming step. The preparing step includes preparing a nylon segment with multiple nylon yarns and an environmental-regenerative segment with multiple polyethylene terephthalate bottles. The pre-treating step includes ruffling the nylon yarns of the nylon segment to form multiple winding nylon crepes and processing the polyethylene terephthalate bottles of the environmental-regenerative segment to form multiple environmental-regenerative crepes. The knitting step includes knitting the nylon crepes of the nylon segment and the environmental-regenerative crepes of the environmental-regenerative segment with a-knitting speed ratio of 4:5. The forming step includes cutting and seaming a basketwork that is knit by the nylon crepes and the environmental-regenerative crepes to form the bathing-massage glove.

Other objectives, advantages and novel features of the invention will become more apparent from the following detailed description when taken in conjunction with the accompanying drawings.

DETAILED DESCRIPTION OF THE PREFERRED EMBODIMENT

With reference to FIGS. 1, 2A, 2B and 6, a method of manufacturing a bathing-massage glove A, A' having an outer surface and an inner surface in accordance with the present invention comprises a preparing step, a pre-treating step, a knitting step and a forming step.

Figure 3:
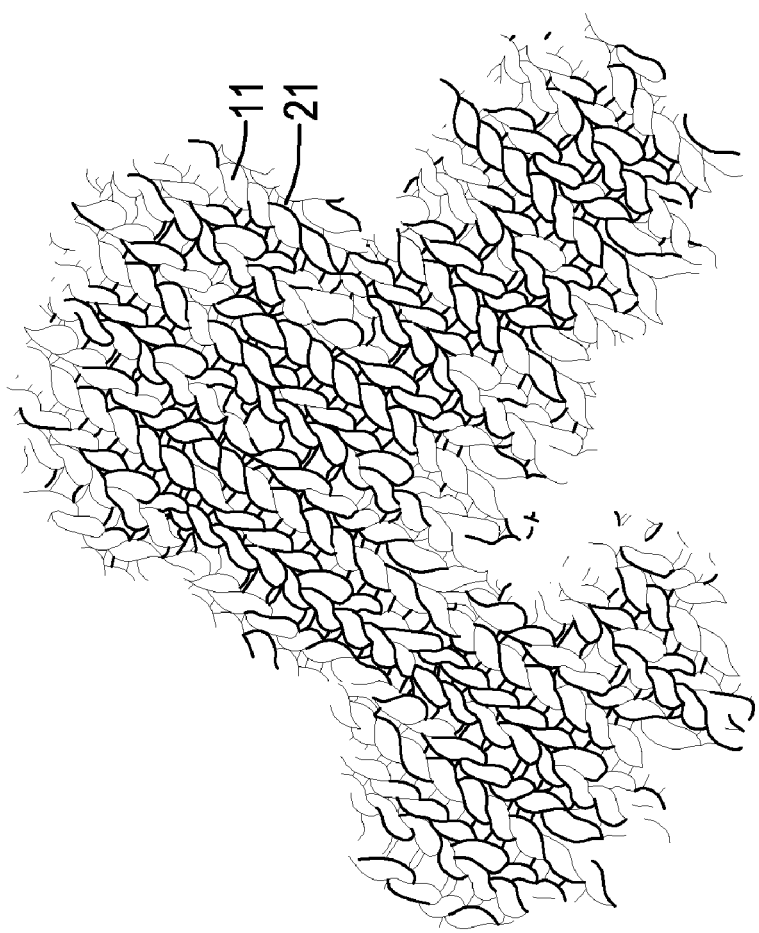
FIG. 3 is an enlarged top view of the bathing-massage glove in FIG. 2A.
Figure 4:
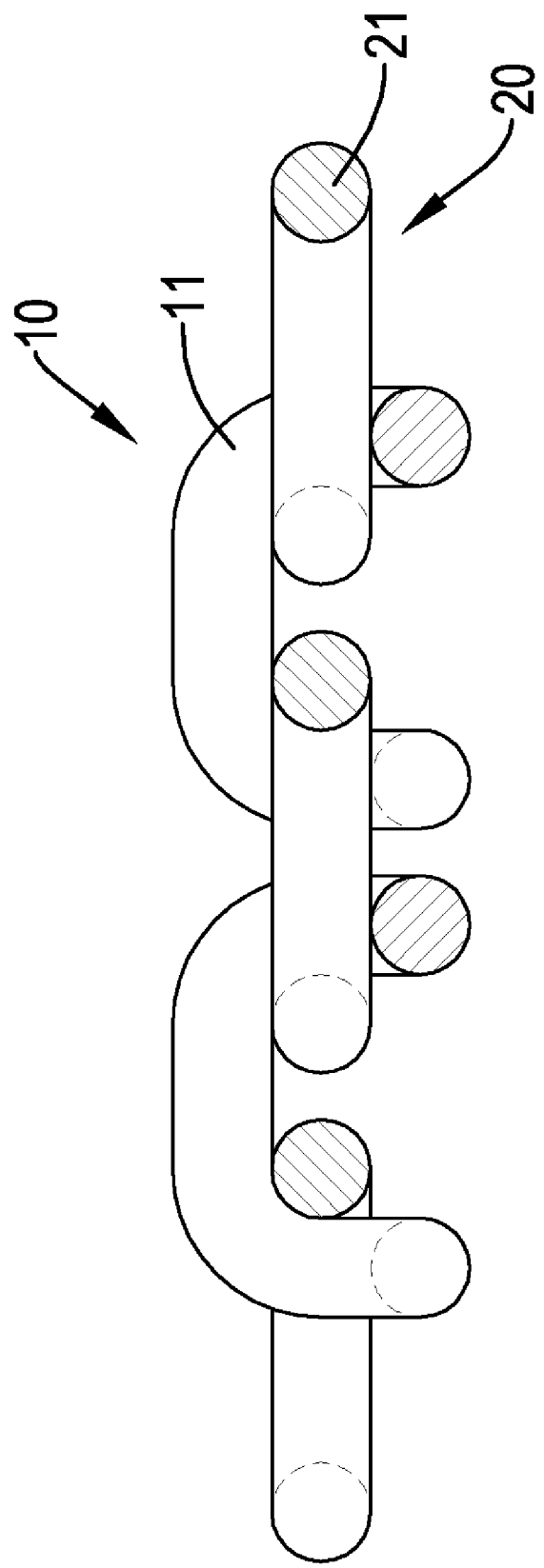
FIG. 4 is an enlarged cross sectional side view of the bathing-massage glove in FIG. 2A.
Figure 5:
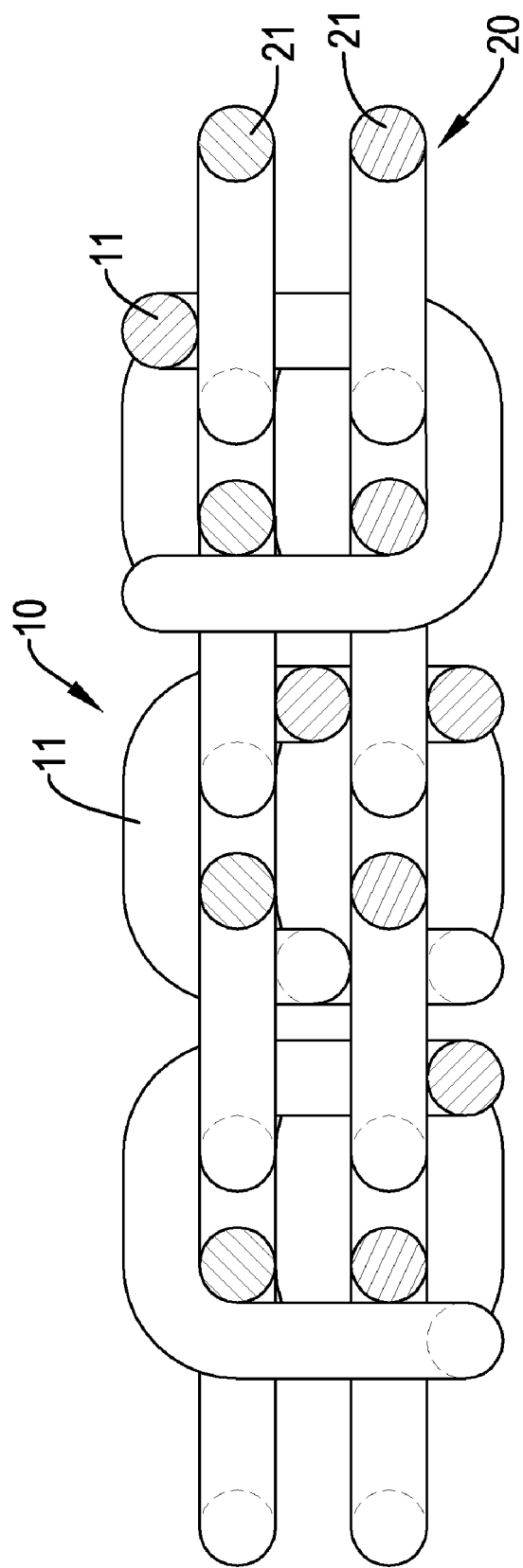
FIG. 5 is another enlarged cross sectional side view of the bathing-massage glove in FIG. 2A.

With reference to FIGS. 3 to 5, the preparing step comprises preparing a nylon segment 10 and an environmental-regenerative segment 20. The nylon segment 10 has multiple nylon yarns. The environmental-regenerative segment 20 has multiple environmental-regenerative crepes 21 that are made from polyethylene terephthalate bottles (P.E. bottles).

The pre-treating step comprises ruffling the nylon yarns of the nylon segment 10 to form multiple winding nylon crepes 11 and processing the P.E. bottles to form the environmental-regenerative crepes 21 of the environmental-regenerative segment 20. Preferably, the step of forming multiple environmental-regenerative crepes 21 comprises cleaning the P.E. bottles, pulverizing the P.E. bottles after cleaning, melting the P.E. bottles, spinning the P.E. bottles after melting to form multiple environmental-regenerative yarns and ruffling the environmental-regenerative yarns to form the environmental-regenerative crepes 21.

Figure 1:
FIG. 1 is a block diagram of a method of manufacturing a bathing-massage glove in accordance with the present invention.
Figure 1:
Figure 1:
Figure 2B:
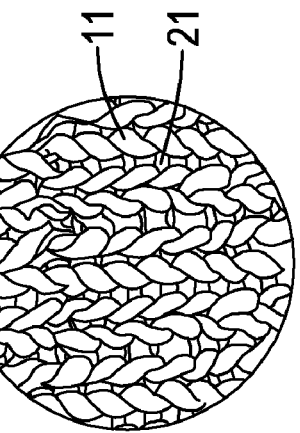
FIG. 2B is an enlarged perspective view of the bathing-massage glove in FIG. 2A.
Figure 2A:
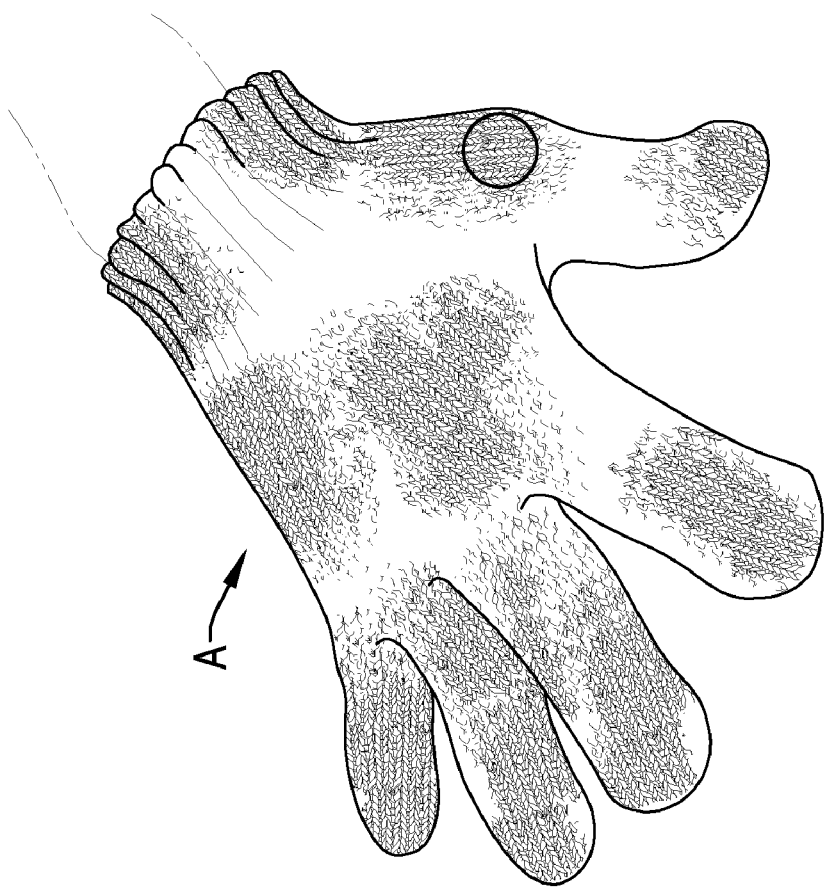
FIG. 2A is a perspective view of a first embodiment of a bathing-massage glove in accordance with the present invention.
Figure 6:
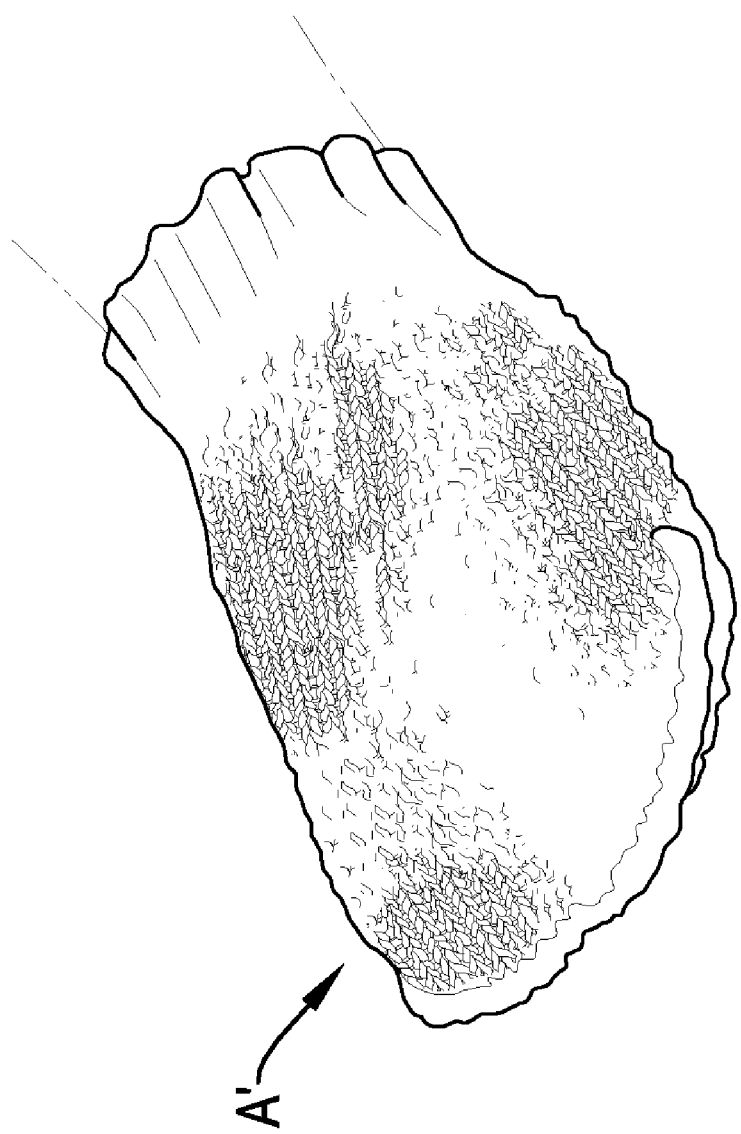
FIG. 6 is a perspective view of a second embodiment of a bathing-massage glove in accordance with the present invention.

The knitting step comprises knitting the nylon crepes 11 of the nylon segment 10 and the environmental-regenerative crepes 21 of the environmental-regenerative segment 20 with a knitting speed ratio of 4:5. With reference to FIG. 4, the nylon crepes 11 are knit up and down through the environmental-regenerative crepes 21 of the environmental-regenerative segment 20 at intervals by a stocking stitch knitting method. With reference to FIG. 5, the nylon crepes 11 are knit up and down through the environmental-regenerative crepes 21 of the environmental-regenerative segment 20 at intervals to enable the nylon crepes 11 to form the outer surface of the bathing-massage glove A' and to enable the environmental-regenerative crepes 21 to form the inner surface of the bathing-massage glove A'. The forming step comprises cutting and seaming a basketwork that is knit by the nylon crepes 11 and the environmental-regenerative crepes 21 to form a wrist-length bathing-massage glove A as shown in FIG. 2A or a mitten bathing-massage glove A' as shown in FIG. 6.

The method of manufacturing a bathing-massage glove in accordance with the present invention can provide a bathing-massage glove that has the nylon segment 10 and the environmental-regenerative segment 20. The nylon crepes 11 of the nylon segment 10 can enhance the structural strength, the tenacity and the tactility of the bathing-massage glove A, A' and the environmental-regenerative crepes 21 of the environmental-regenerative segment 20 can increase the elasticity and water absorption of the bathing-massage glove A, A' and this can provide a preferred bathing-massage effect.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A method of manufacturing a bathing-massage glove that has an outer surface and an inner surface, and the method comprising:
    a preparing step comprising:
        preparing a nylon segment with multiple nylon yarns; and
        preparing an environmental-regenerative segment with multiple environmental-regenerative crepes that are made from polyethylene terephthalate bottles;
    a pre-treating step comprising:
        ruffling the nylon yarns of the nylon segment to form multiple winding nylon crepes; and
        processing the Polyethylene terephthalate bottles of the environmental-regenerative segment to form multiple environmental-regenerative crepes;
    a knitting step comprising knitting the nylon crepes of the nylon segment and the environmental-regenerative crepes of the environmental-regenerative segment with a knitting speed ratio of 4:5; and
    a forming step comprising cutting and seaming a basketwork that is knit by the nylon crepes and the environmental-regenerative crepes to form the bathing-massage glove.

2. The method of manufacturing a bathing-massage glove as claimed in claim 1, wherein the processing step comprises cleaning the polyethylene terephthalate bottles;
    pulverizing the polyethylene terephthalate bottles after cleaning;
    melting the polyethylene terephthalate bottles;
    spinning the polyethylene terephthalate bottles after melting to form multiple environmental-regenerative yarns; and
    ruffling the environmental-regenerative yarns to form the environmental-regenerative crepes.

3. The method of manufacturing a bathing-massage glove as claimed in claim 2, wherein in the knitting step, the nylon crepes are knit up and down through the environmental-regenerative crepes of the environmental-regenerative segment at intervals.

4. The method of manufacturing a bathing-massage glove as claimed in claim 3, wherein in the forming step, the basketwork that is knit by the nylon crepes and the environmental-regenerative crepes is cut and seamed to form a wrist-length bathing-massage glove.

5. The method of manufacturing a bathing-massage glove as claimed in claim 2, wherein in the knitting step, the nylon crepes are knit up and down through the environmental-regenerative crepes of the environmental-regenerative segment at intervals to enable the nylon crepes to form the outer surface of the bathing-massage glove and to enable the environmental-regenerative crepes to form the inner surface of the bathing-massage glove.

6. The method of manufacturing a bathing-massage glove as claimed in claim 5, wherein in the forming step, the basketwork that is knit by the nylon crepes and the environmental-regenerative crepes is cut and seamed to form a mitten bathing-massage glove.

7. A bathing-massage glove comprising:
    a nylon segment having multiple winding nylon crepes; and
    an environmental-regenerative segment knit with the nylon segment and having multiple environmental-regenerative crepes that are made from Polyethylene terephthalate bottles and knit with the winding nylon crepes of the nylon segment;
    wherein the nylon crepes are knit up and down through the environmental-regenerative crepes of the environmental-regenerative segment at intervals.

8. The bathing-massage glove as claimed in claim 7, wherein the bathing-massage glove is a wrist-length bathing-massage glove.

9. A bathing-massage glove comprising:
    a nylon segment having multiple winding nylon crepes; and
    an environmental-regenerative segment knit with the nylon segment and having multiple environmental-regenerative crepes that are made from Polyethylene terephthalate bottles and knit with the winding nylon crepes of the nylon segment;
    wherein the nylon crepes are knit up and down through the environmental-regenerative crepes of the environmental-regenerative segment at intervals to form the nylon crepes as the outer surface of the bathing-massage glove and to form the environmental-regenerative crepes as the inner surface of the bathing-massage glove.

10. The bathing-massage glove as claimed in claim 9, wherein the bathing-massage glove is a mitten bathing-massage glove.

* * * * *